(12) United States Patent
O'Malley et al.

(10) Patent No.: US 11,323,019 B2
(45) Date of Patent: May 3, 2022

(54) SYSTEM AND METHOD FOR CURRENT PULSE MATCHING TECHNIQUE IN A SWITCHED MODE POWER CONVERTER

(71) Applicant: University of Limerick, Limerick (IE)

(72) Inventors: Eamon O'Malley, Claremorris (IE); Patrick Meehan, Pallaskenry (IE); Karl Rinne, Youghal (IE)

(73) Assignee: UNIVERSITY OF LIMERICK, Limerick (IE)

( * ) Notice: Subject to any disclaimer, the term of this patent is extended or adjusted under 35 U.S.C. 154(b) by 0 days.

(21) Appl. No.: 16/954,185

(22) PCT Filed: Dec. 17, 2018

(86) PCT No.: PCT/EP2018/085345
§ 371 (c)(1),
(2) Date: Jun. 15, 2020

(87) PCT Pub. No.: WO2019/115835
PCT Pub. Date: Jun. 20, 2019

(65) Prior Publication Data
US 2021/0159775 A1    May 27, 2021

(30) Foreign Application Priority Data
Dec. 15, 2017 (GB) .................................... 1721037

(51) Int. Cl.
*H02M 1/15* (2006.01)
*H02M 1/44* (2007.01)
*H02M 3/157* (2006.01)
*H02M 1/14* (2006.01)

(52) U.S. Cl.
CPC ............. *H02M 1/15* (2013.01); *H02M 1/143* (2013.01); *H02M 1/44* (2013.01); *H02M 3/157* (2013.01)

(58) Field of Classification Search
CPC ...... H02M 3/156; H02M 3/157; H02M 3/158; H02M 1/15; H02M 1/143; H02M 1/44
See application file for complete search history.

(56) References Cited

U.S. PATENT DOCUMENTS

| 5,602,464 A | * | 2/1997 | Linkowsky | ............... | G05F 3/22 323/272 |
| 6,347,045 B1 | | 2/2002 | Poon et al. | | |
| 6,693,805 B1 | * | 2/2004 | Steigerwald | .............. | H02J 1/02 323/259 |
| 2005/0280405 A1 | | 12/2005 | Bray | | |
| 2014/0042999 A1 | | 2/2014 | Barth et al. | | |

OTHER PUBLICATIONS

PCT/EP2018/085345. Int'l Search Report (dated Apr. 12, 2019).
Son et al. "Generalization of Active Filters for EMI Reduction and Harmonics Compensation." IEEE Industry Applications Conf, 38th IAS Annual Meeting, Salt Lake City, UT (Oct. 12-16, 2003).

* cited by examiner

*Primary Examiner* — Gary L Laxton
(74) *Attorney, Agent, or Firm* — Loza & Loza, LLP; Anthony Smyth (57) ABSTRACT

A switched mode power supply converter comprises a circuit pulse matching circuit configured to negate output voltage disturbance or noise during switching operation of a power conversion. The current pulse matching circuit input is driven by, or from, a power converter switch node of the switched mode power supply converter. The current pulse matching circuit comprises a rate-of-voltage change detection circuit driven by the power converter switch node.

7 Claims, 8 Drawing Sheets

SYSTEM AND METHOD FOR CURRENT PULSE MATCHING TECHNIQUE IN A SWITCHED MODE POWER CONVERTER

CLAIM OF PRIORITY

This application is the U.S. National Stage of International Patent Application No. PCT/EP2018/085345 filed Dec. 17, 2018, which claims priority to GB1721037.8 filed Dec. 15, 2017, both of which are incorporated herein by reference in their entirety.

FIELD

The disclosure relates to switched mode power supply converters.

BACKGROUND

A switched-mode power supply (regulator) utilises a power supply technique to convert and transfer either an AC or DC power source efficiently to DC loads found in modern electronic equipment e.g. data center servers having root-level components (micro-chips) such as multi-core processors, DIMM memories, FPGAs (Field Programmable Gate Array) or application specific system-on-chip (SoC) integrated circuits (ICs).

Figure 1:
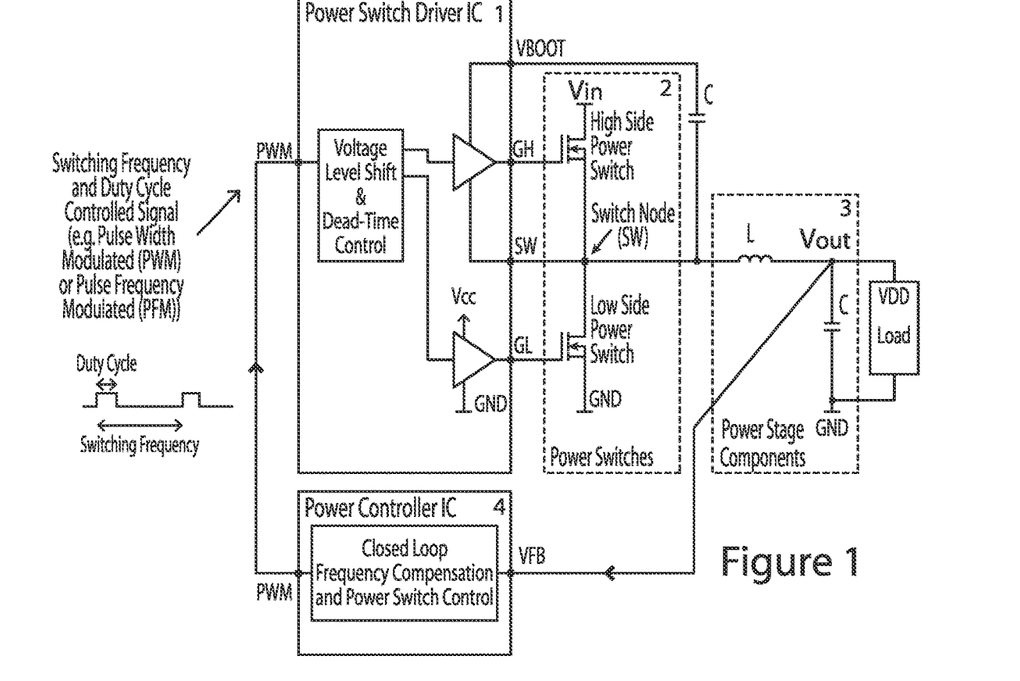
FIG. 1 illustrates a switched-Mode DC-DC Power Converter Block Diagram.

A typical step-down DC-DC converter block diagram is shown in FIG. 1. It is comprised of four main building blocks described in Table 1 and converts the node voltage Vin (e.g. 12 V) in block #2 to a lower voltage Vout (e.g. 1.0 V) in block #3 to power the connected load circuit e.g. FPGA, SoC.

| Block # | Block Name | Block Description |
| --- | --- | --- |
| 1 | Power Switch Driver IC | Voltage level shift the input control signal and provide sufficient drive strength signals to each power switch ensuring no on-time overlap (cross-conduction). |
| 2 | Power Switches | High current capable, fast switching (on/off) power switches. |
| 3 | Power Stage Components | Comprised of discrete inductor-capacitor components for energy storage and switching frequency harmonic low-pass filtering. |
| 4 | Power Controller IC | Closed loop feedback controller to ensure the regulator remains stable. |

This example shows the output of block #4 driving the input of block #1 with a pulse width modulated (PWM) control signal but this can take alternative forms such as pulse frequency modulation (PFM). In addition block #1 and block #4 may reside as part of the same IC, where both the driver and the controller can be designed as a single integrated circuit.

Typically, each DC load in an electronic system will require a separate switching regulator to convert an intermediate DC bus voltage (commonly 12 V) to lower voltage levels e.g. 1.8 V capable of supplying 1-200 A of supply current using either single or multi-phase arrangements at the load (point-of-load—POL).

Figure 2:
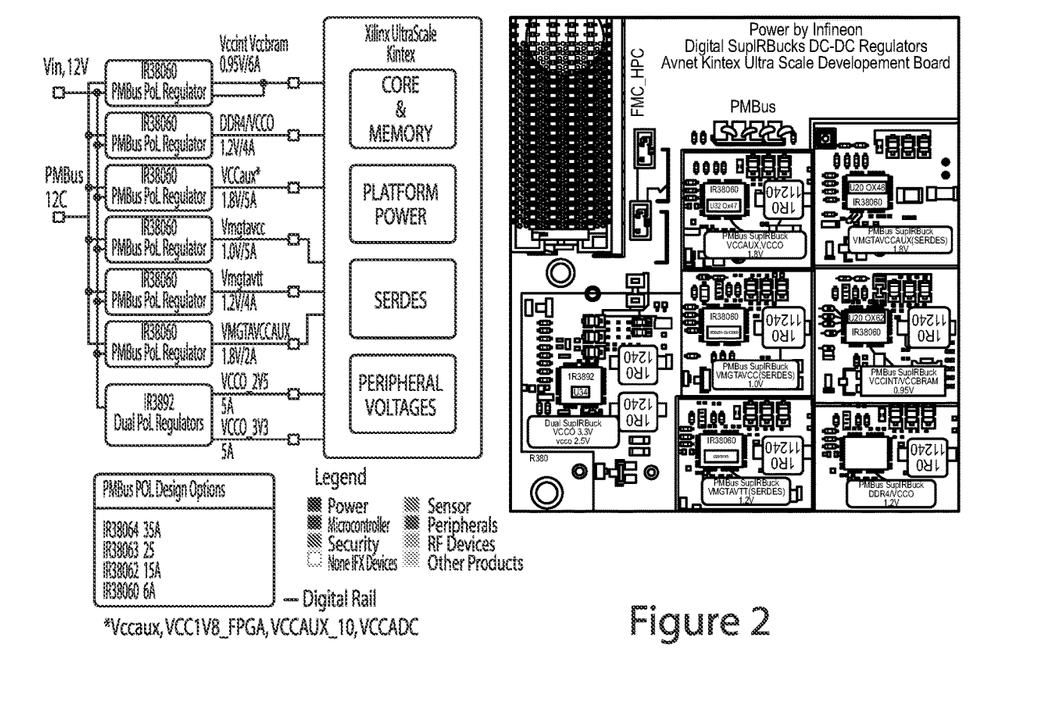
FIG. 2 illustrates Infineon DC-DC Converters for Xilinx UltraScale Kintex FPGA Voltage Rails. Schematic (left), PCB (right) showing the vast number of components and PCB area occupied to provide the power supply solution. Individual converters in white boxes.
Figure 3:
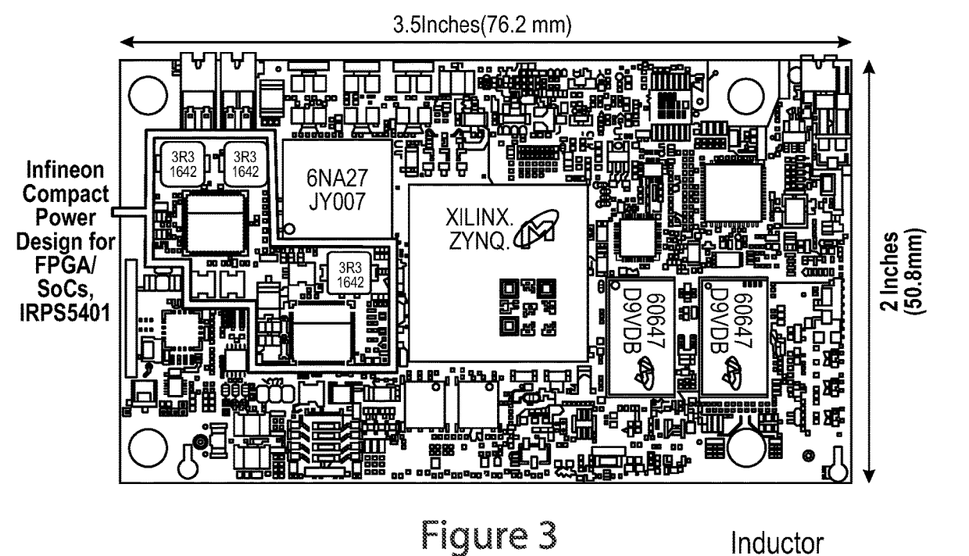
FIG. 3 Infineon DC-DC Converters (yellow outline) for some of the Xilinx ZYNQ FPGA Family Voltage Rails.
Figure 4:
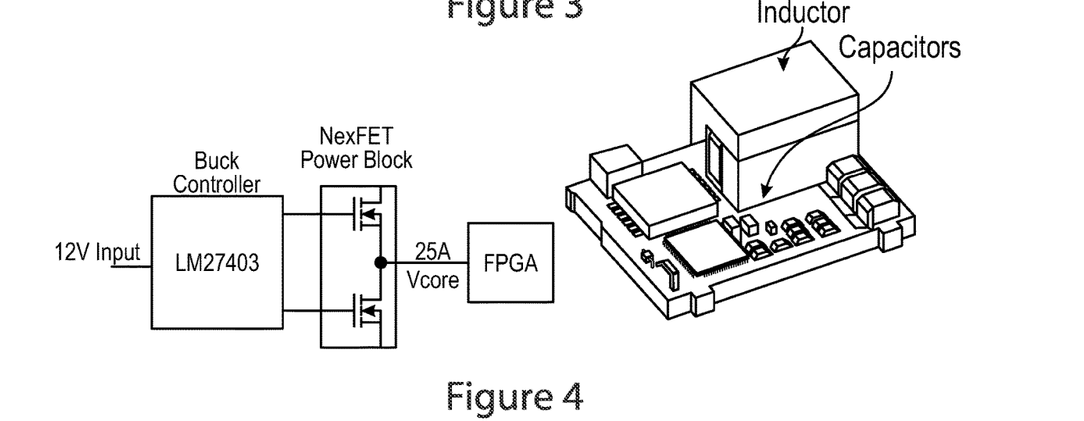
FIG. 4 illustrates a Texas Instruments POL Module for a Single FPGA Voltage Rail where a schematic is shown on the left, and a PCB custom power module shown on the right.

Modern POL power conversion solutions from leading semiconductor companies are presented in FIGS. 2, 3 and 4 which highlight the ever-increasing system level complexity and printed circuit board (PCB) area required to deliver efficient DC power to various high-end loads e.g. Xilinx FPGA ICs. In FIG. 2 there is shown Infineon DC-DC Converters for Xilinx UltraScale Kintex FPGA Voltage Rails. Schematic (left), PCB (right) showing the vast number of components and PCB area occupied to provide the power supply solution. Individual converters in white boxes. In FIG. 3 the outline shows a number of infineon DC-DC Converters for some of the Xilinx ZYNQ FPGA Family Voltage Rails FIG. 4 illustrates a Texas Instruments POL Module for a Single FPGA Voltage Rail. Schematic (left), PCB custom power module (right).

Reducing power system level complexity has and continues to see new technologies advancements such as:

1. IC integration of the power switches with power driver ICs into single IC solutions.
2. Development of custom power modules with optimised PCB layout/size to increase power density.
3. Encapsulation of all power system components into a single IC component.
4. Ultra-small scale power modules via embedded silicon die technology—EDT.
5. Increasing the switching frequency to reduce the physical size of the power inductor using fast switching power ICs.

In addition, industry strives to increase power conversion efficiencies (>90%) in all components of the power system, as illustrated in FIG. 1, but in particular the switching and conduction losses incurred in the power switches. However, limitations in traditional silicon based MOSFET power switches (parasitic capacitance/inductance, packaging) prevent this technology from switching beyond 2-3 MHz with typical switching speeds of 20 V/ns for discrete devices or possibly 10 V/ns for integrated solutions, as disclosed by Zhiyang Chen, Ann Starks, ON Semiconductor, "Application Advantages and Disadvantages of Modern Fast Switching MOSFETs in VRM", PCIM Europe 2016, 1-12 May 2016, Nuremberg, Germany. US patent publication number US2012/0326686, assigned to Qualcomm Inc., discloses a load powered through a single node by a switched mode power supply and depends on a modified envelope tracking circuit and a switching node to operate. The load is an RF power amplifier whose supply voltage Venv can vary with the high frequency envelope tracking signal. It is a requirement that the envelope tracking power supply (Vload) is able to accurately track the modulation envelope. This means that it must be able to accurately follow the modulation envelope at the highest frequencies at which it operates (for example tens MHz). Hence, unlike mainstream dc-dc switching power conversion applications where the load voltage (output voltage) must remain constant or within very limited +/−tolerance levels the power amplifier application permits the voltage at node Vload to vary. This results in mainstream dc-dc switching power supplies requiring the use of additional capacitor components known as decoupling capacitors at the output voltage node (at the point-of-load) to ensure that noise and voltage ripple are reduced to the minimum. In view of the high bandwidth required for envelope tracking system this US publication cannot include these components as it prevents the Vload signal tracking the Venv signal.

Recent technology developments in gallium arsenide (GaN) based power switches capable of switching speeds of greater than 100 V/ns operating at tens of MHz with lower physical area and associated power loss figures are seeking to replace silicon based FET solutions, for example as disclosed by Michael do Rooij, Johan Strydom, "Introducing a Family of eGaN FETs for Multi-Megahertz Hard Switching Applications", Application Note AN015, http://epc-co.com/epc. Efficient Power Conversion GaN Products, http://epc-co.com/epc/Products/eGaNFETsandICs.aspx;
GaN Systems Products, https://www.gansystems.com/transistors.php The potential order of magnitude increase in switching frequency will allow the passive L-C components to reduce in value/physical size. However a problem arises with output voltage disturbance/noise for high switching rate power conversion applications.

An object of the invention is to resolve a voltage disturbance/noise issue in switch mode power conversion applications.

SUMMARY

According to the invention there is provided, as set out in the appended claims, a control circuit for use in a switched mode power supply converter, said control circuit comprises a current pulse matching circuit or module configured to negate output voltage disturbance/noise during a high switching rate power conversion application.

The invention provides a system and method for current pulse matching technique to avoid output voltage disturbance/noise in high switching rate power conversion applications. In one embodiment the circuit in a switched mode power supply converter, said circuit comprises a current pulse matching circuit configured to negate regulated output voltage disturbance/noise during the switching process of power conversion. The current pulse matching circuit contains a rate-of-voltage change detection circuit driven by the switching power converter switch node. The output from this detection circuit configures the current pulse matching circuit to source/sink the correct noise cancellation current.

In one embodiment there is provided a circuit in a switched mode power supply converter, said circuit comprises a current pulse matching circuit configured to negate output voltage disturbance/noise during switching operation of a power conversion and the current pulse matching circuit input is driven by, or from, a power converter switch node of the switched mode power supply converter, wherein the current pulse matching circuit comprises a rate-of-voltage change detection circuit driven by the power converter switch node.

In one embodiment the current pulse matching circuit or module is configured to provide an injected matching current pulse adapted to cancel a power stage current pulse to negate output voltage disturbance/noise during the high switching rate power conversion application.

In one embodiment the current pulse matching circuit or module is connected to a power switch node of the switched mode power supply converter. It will be appreciated that only a single node is required for operation.

In one embodiment the control circuit is a power driver circuit.

In one embodiment the current pulse matching circuit or module comprises a high-speed rate of voltage change (dVsw/dt) detection circuit driven by the power switch node.

In one embodiment the current pulse matching circuit or module comprises a high bandwidth current source/sink circuit configured to provide the injected matching current pulse by matching the magnitude and time duration of the charging/discharging current and having an opposite polarity to said charging/discharging current.

In one embodiment the matching of the injected matching current pulse is performed using a programmable gain amplifier.

In one embodiment the charging/discharging current and the generated matched current is summed at a circuit node Vout with the power stage generated such that the total current at this circuit node is zero or substantially zero.

In one embodiment there is provided switching speeds of greater than 100 V/ns operating at a high switching rate, for example 1 MHz or greater.

In one embodiment the power driver circuit is an Integrated Circuit (IC).

In one embodiment there is provided a circuit in a switched mode power supply converter, said circuit comprises a current pulse matching circuit configured to negate output voltage disturbance/noise during switching operation of a power conversion and the current pulse matching circuit input is driven by, or from, a single power converter switch node of the switched mode power supply converter, wherein the current pulse matching circuit comprises a rate-of-voltage change detection circuit driven by the single power converter switch node.

In another embodiment there is provided a method of controlling a switched mode power supply converter, comprising the steps of configuring a current pulse matching circuit to negate output voltage disturbance/noise during switching operation of a power conversion by using a rate-of-voltage change detection circuit driven by a power converter switch node; and connecting the current pulse matching circuit input to be driven by, or from, the power converter switch node of the switched mode power supply converter.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

FIG. 9 illustrates a narrow pulse of charging/discharging current of short time duration wherein Charging Capacitor $C_p$ Current Pulse ($iC_p$) at High Side Switch Turn-on;

DETAILED DESCRIPTION OF THE DRAWINGS

Figure 5:
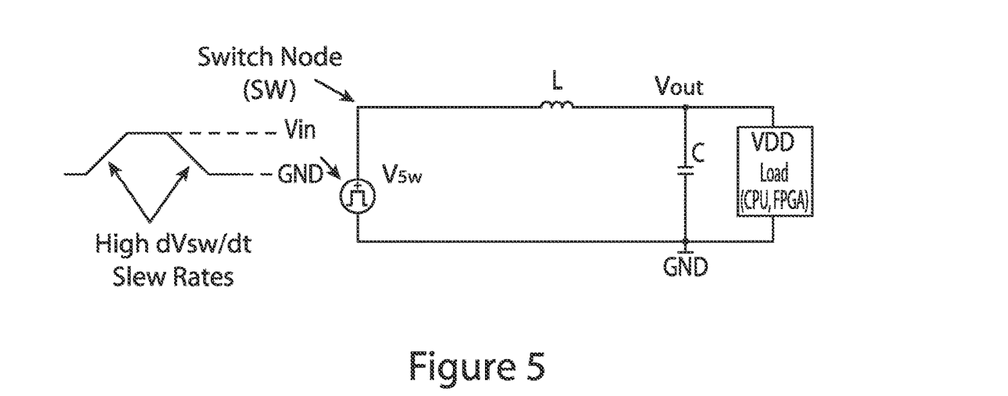
FIG. 5 illustrates a High Slew Rate Voltage Source Driving L-C Power Stage Filter, which shows a reduced Circuit Model of the DC-DC Converter System with Ideal Power Stage L-C Components.

FIG. 5 illustrates a High Slew Rate Voltage Source Driving L-C Power Stage Filter, which shows a reduced circuit model of a DC-DC power converter system 1 with ideal power stage L-C components 2, 3. Increasing the operating switching frequency of the power converter effectively presents to its switching node (SW) 4 and hence the input to the passive L-C circuit 2, 3 has a fast slew rate (slope) or high dVsw/dt switching voltage 6 between ground and Vin (e.g. 12 V) or vice versa is shown in FIG. 5.

Figure 6:
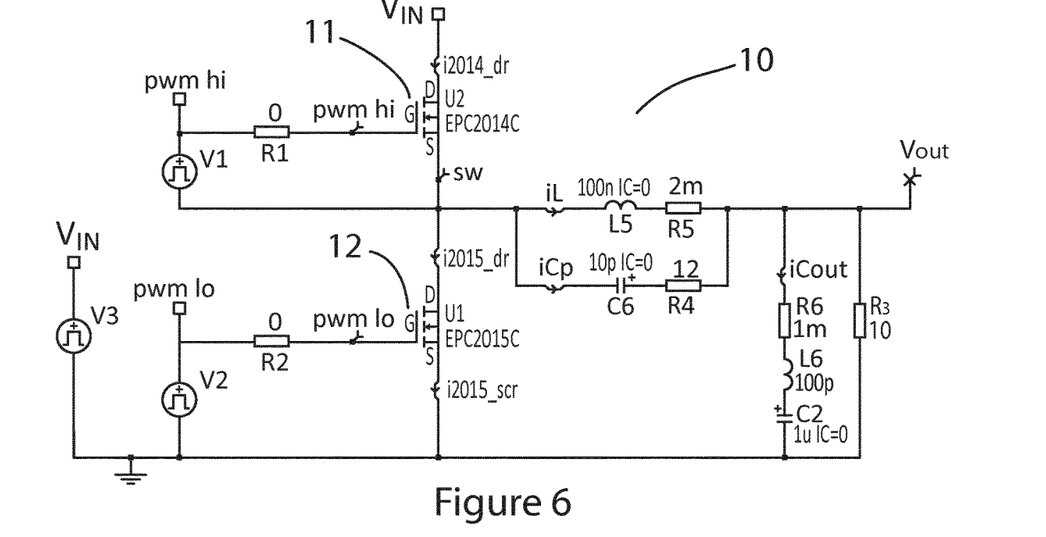
FIG. 6 illustrates an open-loop circuit using EPC GaN Power Switches (for example EPC2014/EPC2015) operating at 10 MHz.
Figure 7:
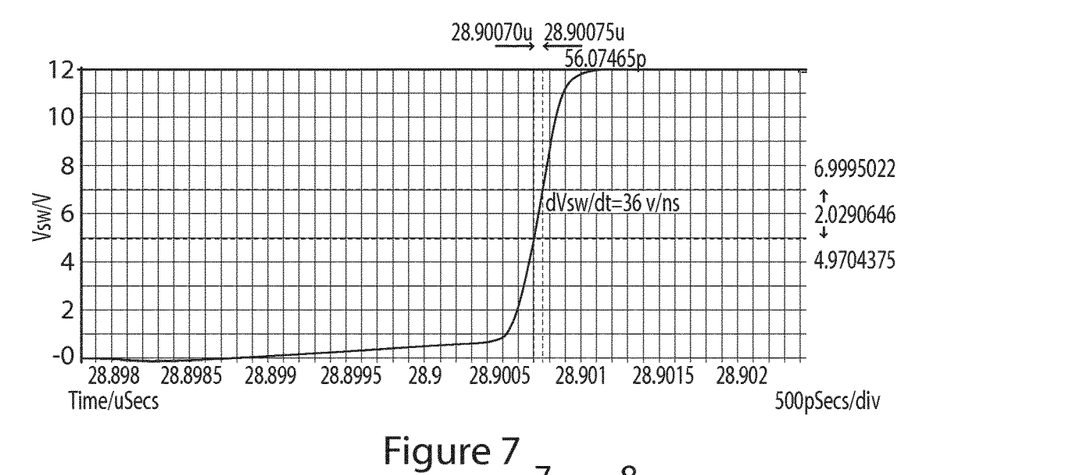
FIG. 7 illustrates a High Slew Rate Voltage at node SW (36 v/ns) when switching GaN Power Switches at 10 MHz.

An open-loop (with no power controller IC feedback or power driver IC) circuit indicated generally by the reference numeral 10 is configured to directly drive state of the art GaN power switches 11, 12 at 10 MHz (having rise/fall times of 1 ns) is shown in FIG. 6. The values shown are non-limitative values and are shown for illustration only. This leads to the $V_{sw}$ signal shown in FIG. 7 highlighting the input to the L-C circuit has a slew-rate of 36 V/ns (dVsw/dt).

Figure 8:
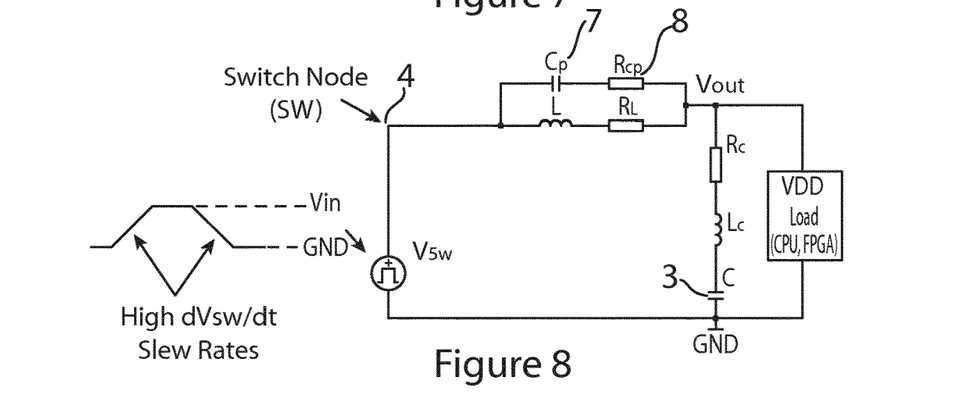
FIG. 8 illustrates non-Ideal L-C Components showing parasitic elements of Inductor L and Capacitor C.

Physical L-C components are not ideal and have associated parasitic components, as shown in FIG. 8. The inductor L has a series DC resistance $R_L$ (DCR) and parallel capacitance, 7, $C_p$ (typ<3 pF) having an effective series resistance, 8, $R_{Cp}$ while the output capacitor C has an effective series resistance $R_C$ and inductance $L_C$ (typ<250 pF).

Figure 9:
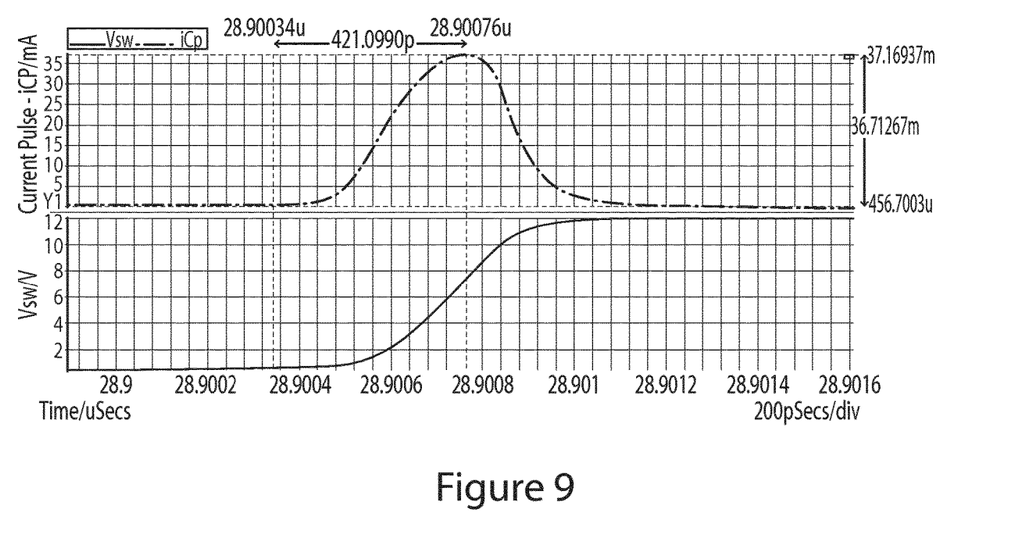

When triggered with a positive or negative going high $dV_{sw}/dt$ voltage, as shown in FIG. 8, the parallel capacitor ($C_p$) 7 charges or discharges (at high side power switch turn-on and turn-off (low-side turn-on) respectively) leading to a narrow pulse of charging/discharging current of short time duration. This is shown in FIG. 9 where the top waveform shows approximately 600 ps for this example. The peak value of the $C_p$ charge/discharge current is given by, $$iCp = Cp * \frac{dVsw}{dt}$$

Figure 10:
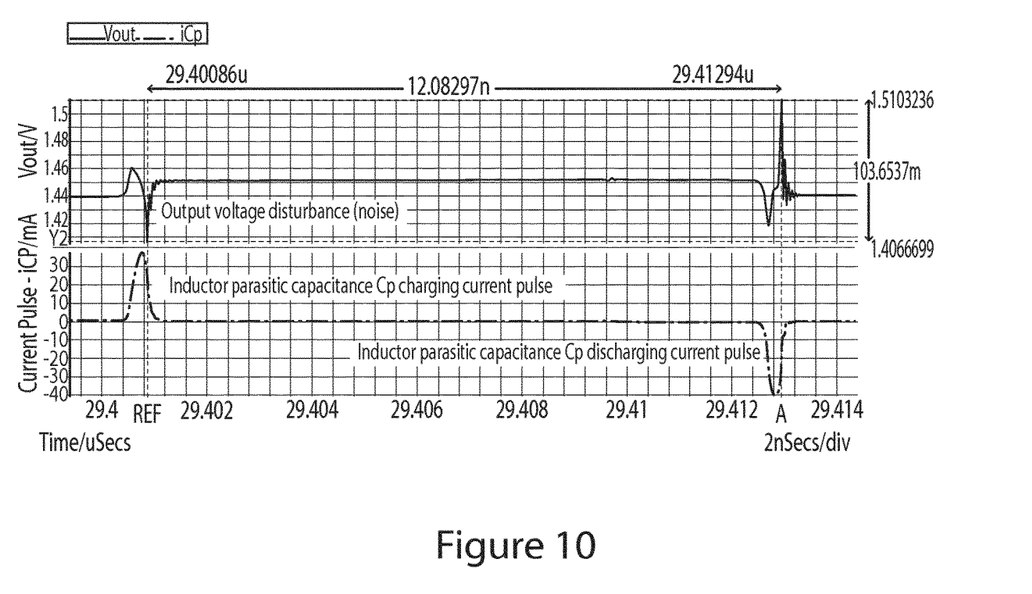
FIG. 10 illustrates an output Voltage (Vout) Transient Disturbance caused by $iC_p$ Current Pulse—~104 mV peak-peak voltage.

The $C_p$ current pulse results in a substantial output voltage disturbance as shown in FIG. 10, for node Vout, forcing the power regulator away from its programmed set-point voltage, a precise voltage required by the load, potentially causing the load circuit to malfunction. Typical load regulation specifications are expected to meet a +/−0.5% tolerance over all operating conditions e.g. Vout=1 V must stay within the regulation band of 1.01 V to 0.99 V.

Figure 11:
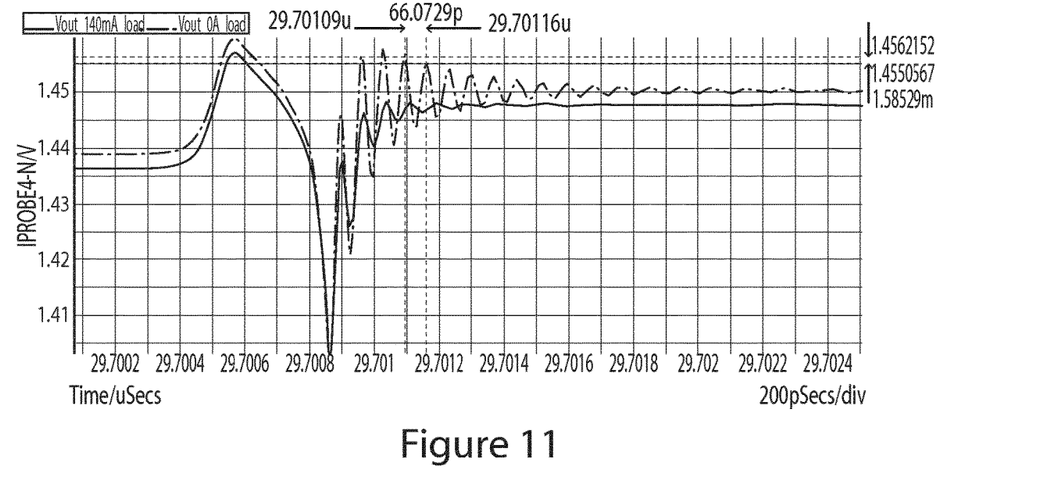
FIG. 11 illustrates an output Voltage (Vout) Transient and Oscillation at resonant frequency of parasitic L-C circuit of $L_C$-$C_p$.

In addition, depending on the load current demand (for example 5 A, 1 A, 0 A) the series L-C circuit formed by the parasitic components $L_C$ and $C_p$ can resonate at a frequency given by, $$fr = \frac{1}{2\pi\sqrt{L_C * C_p}}$$

resulting in oscillations in the output voltage Vout potentially causing the power system to go unstable, as illustrated in FIG. 11.

Given the strict POL regulation specifications it is imperative that this problem arising from high frequency/slew-rate switching be resolved to enable technologies such as advanced silicon and GaN FETs to be employed in mass-produced power conversion solutions.

To date other issues arising from switching the power FETs at high frequency (and localised to the FETs) are resolved by a series of performance degrading circuit techniques namely (and hence the possible power system performance gains are severely restricted):

1. Reduce the operating frequency/switching speed either directly via the power system feedback controller or by adding series gate resistors before each power FET to decrease their switching speeds.
2. Add an R-C discrete circuit between the switching node (SW) and ground to dampen the oscillation/ringing energy (sometimes referred to as a snubber circuit).
3. Rely on the end customer performing optimised PCB layout to reduce connection parasitic inductance/capacitance on high switching current loops.
4. Add discrete ferrite bead components to reduce switching speed and filter unwanted oscillation/ringing voltages.

However, none of these workarounds address the problem of voltage disturbance/noise issue in switch mode power conversion applications.

Figure 12:
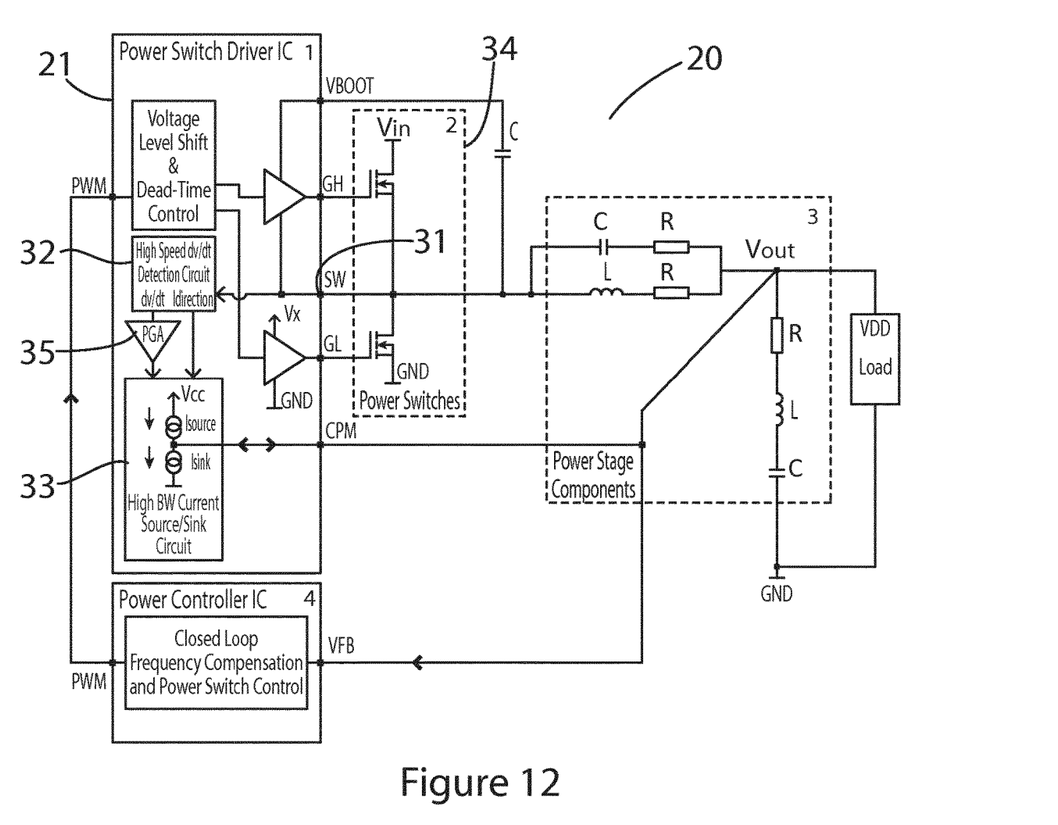
FIG. 12, is similar to FIG. 1, and illustrates a Current Pulse Matching (CPM) module added to a Power Driver IC or control circuit according to one embodiment of the invention.

The solution of the present invention involves a circuit design integrated within a power driver IC circuit as shown in FIG. 12, indicated generally by the reference numeral 20. FIG. 12 is similar to FIG. 1 with a Current Pulse Matching (CPM) circuit or module 21 added to the Power Driver Integrated Circuit (IC). It will be appreciated that the CPM 21 acts as a control circuit and can be integrated in other parts of the regulator or embodied as a standalone circuit. It will also be appreciated that in the context of the present invention the term high frequency operating speeds can be interpreted to mean 1 MHz or greater.

Figure 13:
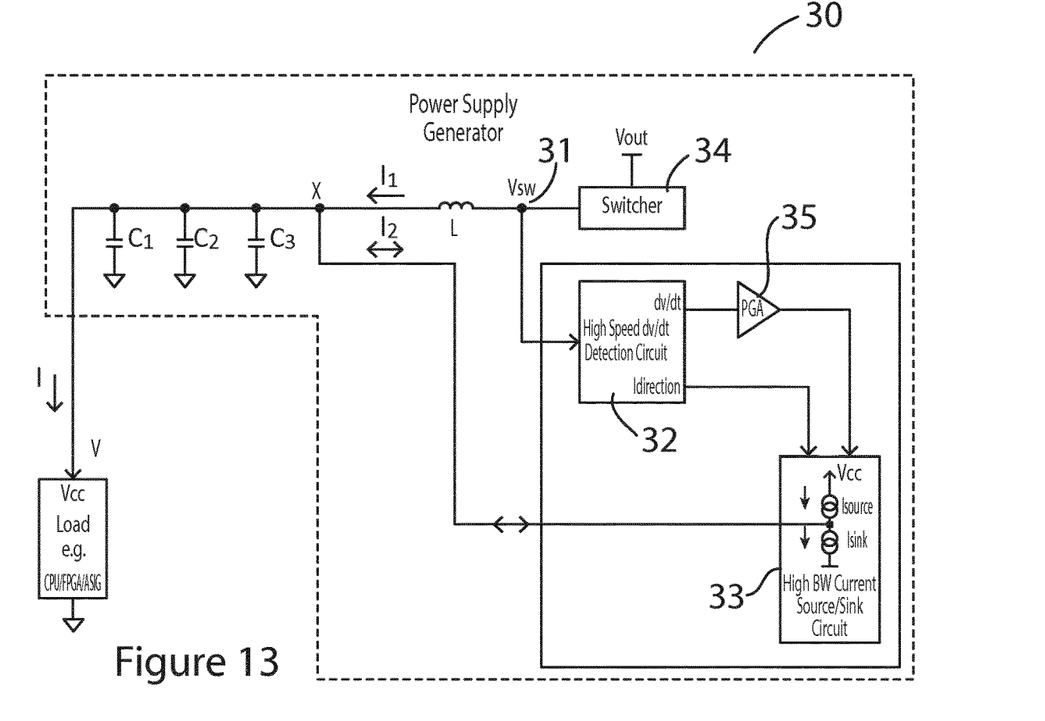
FIG. 13 is a simplified block diagram schematic of FIG. 12 illustrating an embodiment of the invention.
Figure 14:
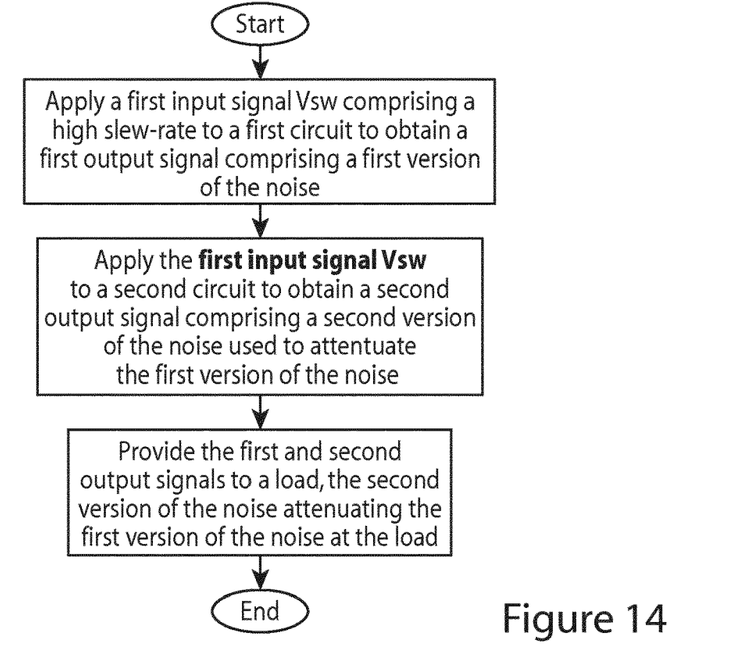
FIG. 14 illustrates a flowchart showing operation of the circuit illustrated in FIGS. 12 and 13.

FIG. 13 is a simplified block diagram schematic of FIG. 12 illustrating a preferred embodiment of the invention indicated by the reference numeral 30. FIG. 13 shows a load powered through a single node 31 by a dc-dc switched mode power supply converter. The embodiment of FIG. 13 does not require the use of a "second signal". The load referred to in FIG. 13 is generally unknown (typical examples might-be high-performance CPUs (e.g. Intel/Nvidia/Apple) whose supply voltages are required to remain effectively constant (DC) or within very strict tolerance variations under different operating conditions (e.g. a 1V supply voltage may be allowed to vary by +/−1%). This necessitates the use of de-coupling capacitor banks (C1 . . . Cn) but the generated noise issue described above still remains. The Current Pulse Matching (CPM) module specifically attenuates an additional output noise voltage (component) resulting from switching the converter at several MHz using power switches 34 (e.g. GaN switches) capable of extremely high slew rates (dVsw/dt) at node Vsw. The current pulse matching circuit configured to negate output voltage disturbance/noise during switching operation of a power conversion and the current pulse matching circuit input is driven by, or from, a power converter switch node, Vsw, 31. The Vsw node 31 does not contain the noise. Instead the high voltage slew rate at node Vsw 31 provides the stimulus for an additional voltage noise component to be present at the load voltage node Vload due to the charging/discharging of the parasitic capacitance (C6) of the main circuit inductor L as shown in FIG. 6. FIG. 14 illustrates a flowchart showing operation of the circuit illustrated in FIGS. 12 and 13.

The IC based solution involves the use of a high-speed rate of voltage change (dVsw/dt) detection circuit 32 driven by a single power stage SW node 31. The dVsw/dt detector 32 can be combined with a high bandwidth current source/sink circuit 33 capable of matching the magnitude (for example via a programmable gain amplifier 35 (PGA)) and time duration of the charging/discharging current $iC_p$ presented in FIG. 7 but having opposite polarity.

Figure 15:
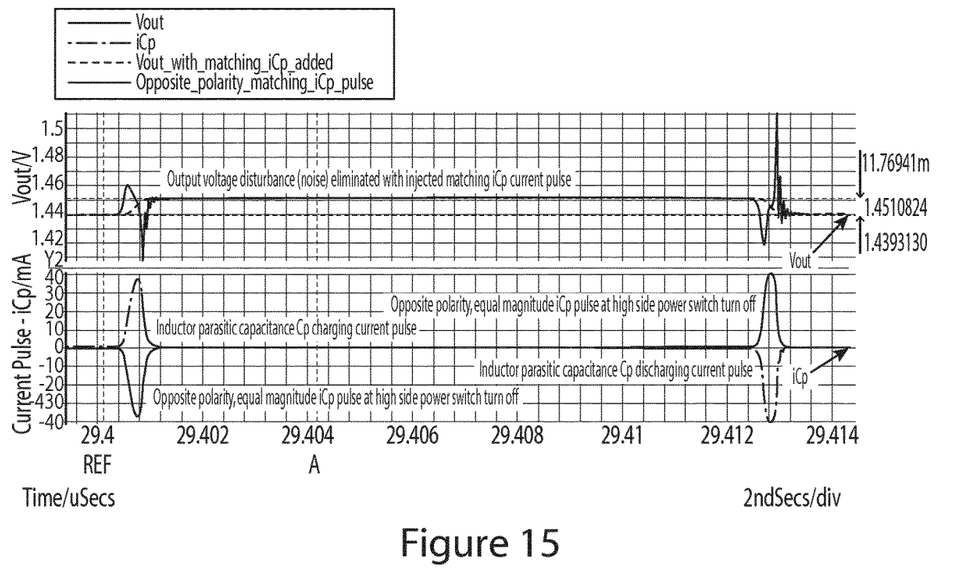
FIG. 15 illustrates a matching iCp (bottom trace) with opposite Polarity to Power Stage $iC_p$ eliminates the Vout Disturbance/Oscillation.

When the generated matched $iC_p$ current is summed at the circuit node Vout with the power stage generated $iC_p$ the total current at this circuit node is 0 A i.e. the injected matching current pulse cancels the power stage current pulse. Hence, the output voltage node Vout no longer exhibits a voltage disturbance as shown in FIG. 15—continuous trace compared to dotted trace (no current pulse matching).

Figure 16:
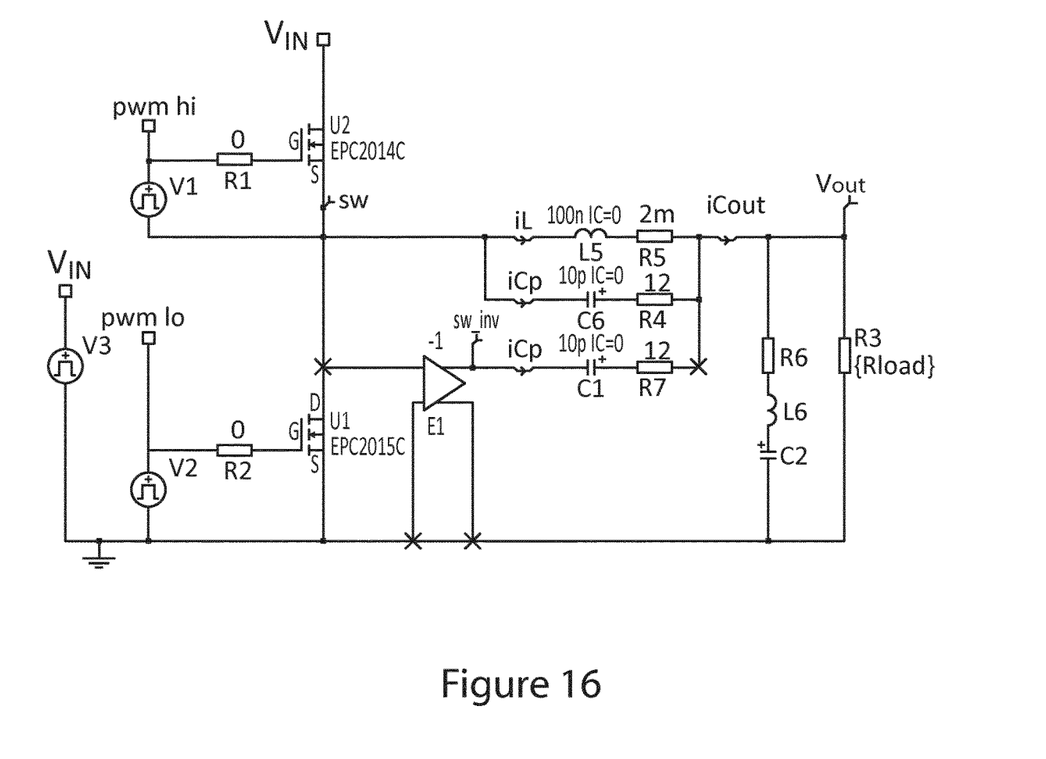
FIG. 16 illustrates a circuit model for Current Pulse Matching according to one embodiment of the invention.
Figure 17:
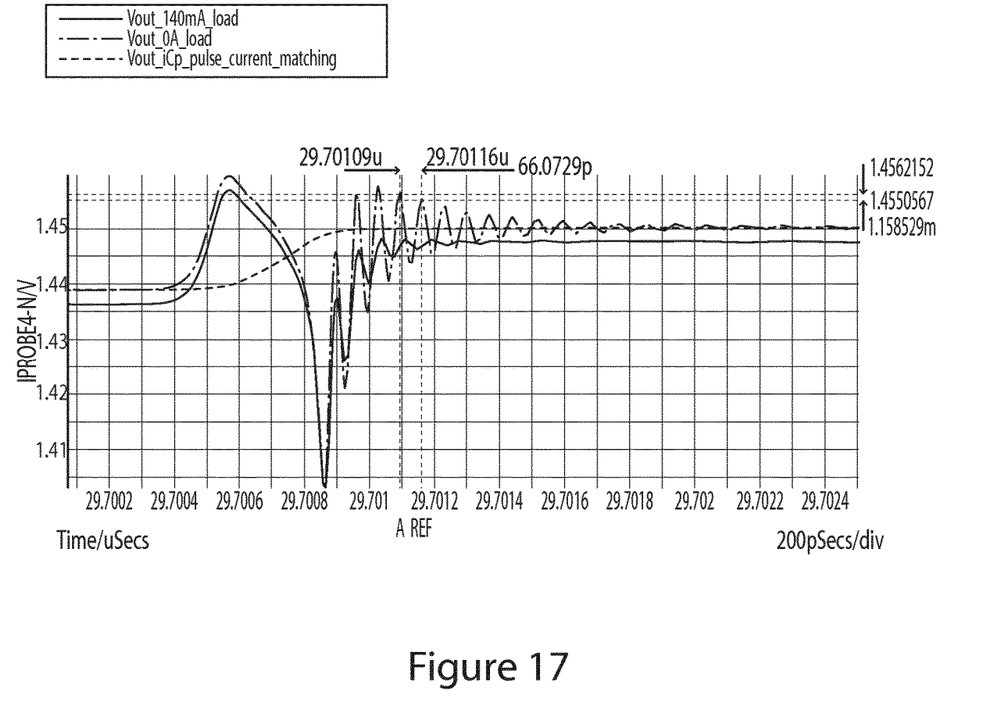
FIG. 17 illustrates a Vout disturbance eliminated under a number of load current conditions.

The control circuit solution and presented signal waveforms were developed using a circuit model and state of the art GaN power switches from EPC operating at 10 MHz. FIG. 16 shows a non-limitative example circuit embodiment with the solution showing the matching inverse polarity current being summed at the Vout node to the power stage parasitic current pulse $iC_p$. FIG. 17 illustrates that the solution is independent of operating load current.

For clarity, the solution shows a pin on the power driver IC called CPM. However as shown in FIG. 12 the $V_{out}$ node is already available to the system (for closed loop voltage regulation) hence no new pins are required by the driver IC (with the SW node already required by $V_{BOOT}$ voltage function). Alternatively, an off the shelf driver from another vendor can be used in combination with the control circuit as hereinbefore described.

The solution benefits the overall power system via integration into the power driver IC and does not require any external discrete components.

In the context of the present invention the terms "Integrated" to mean housed within a common IC package with the switching-regulator circuitry, as hereinbefore described with reference to the description and/or figures. The terms 'circuit' and 'module' should also be afforded a broad interpretation.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A current pulse matching circuit in a switched mode power supply converter, wherein the current pulse matching circuit is configured to negate output voltage disturbance or noise during switching operation of a power conversion and an input of the current pulse matching circuit is driven by, or from, a power converter switch node of the switched mode power supply converter, wherein the current pulse matching circuit comprises:
  a rate-of-voltage change detection circuit driven by the power converter switch node, and
  a current source or sink circuit configured to provide an injected matching current pulse by matching a magnitude and a time duration of charging or discharging current, wherein the injected matching current pulse has an opposite polarity to said charging or discharging current, and wherein matching of the injected matching the magnitude and the time duration is performed using a programmable gain amplifier.

2. The current pulse matching circuit of claim 1 wherein the current pulse matching circuit is configured to provide a matching current pulse adapted to cancel a power stage current pulse to negate output current or voltage disturbance or noise during the power conversion process.

3. The current pulse matching circuit of, claim 1, wherein the current pulse matching circuit is a discrete circuit.

4. The current pulse matching circuit of, claim 1, wherein the current pulse matching circuit is an integrated circuit.

5. The current pulse matching circuit of, claim 1, wherein the rate-of-voltage change detection circuit is a high-speed rate of voltage change (dVsw/dt) detection circuit.

6. The current pulse matching circuit of claim 1, further comprising:
  a power stage, wherein the charging or discharging current and the generated matched current is summed at a node Vout of the power stage such that total current at the node Vout is zero or substantially zero.

7. A switched mode power supply converter comprising:
  a power converter switch node;
  a current pulse matching circuit configured to negate output voltage disturbance or noise during a power conversion switching operation, wherein the current pulse matching circuit has an input that is driven using the power converter switch node;
  a rate-of-voltage change detection circuit driven by the power converter switch node; and
  a current source or sink circuit configured to provide an injected matching current pulse that matches a magnitude and a time duration of a charging or discharging current, the injected matching current pulse having an opposite polarity to the charging or discharging current, wherein the current pulse matching circuit includes a programmable gain amplifier used to match the magnitude and the time duration of the charging or discharging current.

* * * * *